United States Patent [19]

Nakabayashi

[11] Patent Number: 5,550,593
[45] Date of Patent: Aug. 27, 1996

[54] MULTIPLEX COMMUNICATION SYSTEM USING SEPARATED AND MULTIPLEXED DATA

[75] Inventor: Jiro Nakabayashi, Urawa, Japan

[73] Assignee: Sharp Kabushiki Kaisha, Osaka, Japan

[21] Appl. No.: 400,486

[22] Filed: Mar. 8, 1995

Related U.S. Application Data

[63] Continuation of Ser. No. 143,150, Oct. 29, 1993, abandoned.

[30] Foreign Application Priority Data

Nov. 30, 1992 [JP] Japan .................................. 4-345392

[51] Int. Cl.$^6$ ...................................................... H04N 7/00
[52] U.S. Cl. .............................................. 348/465; 370/84
[58] Field of Search ...................................... 348/465, 461, 348/469, 462, 467; 370/84; H04N 7/00

[56] References Cited

U.S. PATENT DOCUMENTS

| | | | |
|---|---|---|---|
| 4,887,158 | 12/1989 | Guichard et al. | 348/17 |
| 4,926,420 | 5/1990 | Shimzu | 370/82 |
| 5,138,440 | 8/1992 | Radice . | |
| 5,164,938 | 11/1992 | Jurkevich et al. | 370/84 X |
| 5,202,886 | 4/1993 | Rossi et al. | 370/84 X |
| 5,228,033 | 7/1993 | Okouchi | 348/469 X |
| 5,231,492 | 7/1993 | Dangi et al. | 348/19 |
| 5,251,217 | 10/1993 | Travers et al. | 370/84 X |
| 5,291,286 | 3/1994 | Murakami et al. | 370/82 X |

OTHER PUBLICATIONS

"The DARPA Experimental Multimedia Mail System" by A. R. Katz et al, *Computer* vol. 18, No. 10, Oct. 1985, Silver Spring Maryland, pp. 82–89.
"Universal Videocodec for ATM Networks" by S. D'Agostino, *Revue Hf Tijdschrift* vol. 15, No. 3/4, Mar. 1991, Brussels, pp. 102–112 XP000307855.
European Search Report.
"Codec For Video Delivery Services And Video Conference Services", Tomura et al., I.E.I.C.E., No. IE93–41, (1993), pp. 41–47.

*Primary Examiner*—Victor R. Kostak

[57] ABSTRACT

The purpose of the invention is to provide a system capable of easily reproducing an image from interframe predictive signals conventionally used for, e.g., visual telephone communications. Video and audio signals multiplexed by first separating and multiplexing device are assembled into packets proportional to a bit rate of the multiplexed data by a packet separating-multiplexing device and completed with information on the multiplexing conditions, i.e., packet structure. The packets are then stored and when the stored packets are reproduced, the packet separating-multiplexing device judges the structure of the packet according to the information of the multiplexing conditions and disassembles the packets into individual data and decodes the video and sound signals.

14 Claims, 8 Drawing Sheets

MULTIPLEX COMMUNICATION SYSTEM USING SEPARATED AND MULTIPLEXED DATA

This application is a continuation, of application Ser. No. 08/143,150 filed on Oct. 29, 1993, now abandoned.

BACKGROUND OF THE INVENTION

1. Field of Invention

The present invention relates to a video communications system and more particularly to a video communications system capable of compressing information that represents an image, particularly, a dynamic image i.e. a moving picture, of multiplexing and storing the information and audio data and finally of regenerating and decoding the stored information.

2. Description of the Background Art

Recently, in addition to conventional communications services, i.e. telephone and facsimile, audio storage and delivery services have been available over certain networks to allow audio data to be stored temporarily until a particular destination terminal was available.

The progress in digital communications networks, i.e. ISDN (Integrated Services Digital Networks) enables the terminal users to receive video communications services by means of visual telephone terminals. With such a background, there is an increasing demand for video storage and delivery services which are put into practice with certain local applications.

In a conventional video communications system, an input video signal through the camera of the transmitting terminal enters into the encoding portion whereby it is encoded with stored amounts of information by an interframe predictive coding method. On the other hand, an audio signal input through the handset is encoded by the audio encoding portion. Both encoded video and audio signals enter into the multiplexing portion whereby they are combined with each other and completed with a video control signal designated by the terminal system control unit after which they are sent to the communications network. The multiplexed data is transmitted over the network to the remote terminal wherein the data is separated into individual signals i.e., a video signal, an audio signal and a video control signal by the action of a multiplexing portion. The video control signal, the video coded signal and the audio coded signal are transferred to the system control unit, the video decoding portion and the audio decoding portion, respectively. In the video decoding portion, the video data encoded by the interframe predictive coding method is decoded and then is put out to create an image on the screen of the monitor. In the audio decoding portion, coded audio data is decoded and put out to the handset. The video control signal is treated by the system control unit. The above-mentioned actions are conducted through a two-way transmission line to produce bidirectional visual telephone communications.

The interframe predictive coding method is such that video data of a predicted picture is encoded in a compressed form to include only differential data between a standard updated picture and the succeeding picture, utilizing a very strong correlation between the frames of the moving picture data. This method enables us to considerably reduce the number of video data needed to be transmitted since the predicted picture includes a very small amount of data in comparison with the updated picture. The header information is attributive information attached, when coding, to the beginning of the corresponding frame of video data. The updated picture is one frame of video data encoded therein in the same way as a still picture, and after coding, it has a number of coded data equivalent to that of the still picture. The interframe predicted picture is defined by determining the difference between the updated video data and the video data of a subsequent frame and it is represented as a frame which includes only differential data.

In a conventional video storing and reproducing system utilizing still pictures, the host and the terminal are connected to a communications network (such as ISDN) and operate to gain access to each other at the host's or the terminal user's request. When a circuit therebetween is established, a guiding picture from the host is displayed on the screen of the monitor. Referring to the guiding display, the terminal user selects a menu for storing or reproducing video signals by one frame representing a still image with a audio signal. The video signal to be stored in the memory is input through the camera and an audio signal to be stored is input through the handset. The input video and audio signals are encoded respectively by the video encoding portion and the audio encoding portion and then they are transmitted over the communications network to the host which in turn combines and stores the received encoded video and audio signals in the storage device.

A set of data is described in such a way that a packet of one-frame video data is combined with the audio data having an identifying flag and the character data also having an identifying flag. The number of bits in a packet of video data depends upon the types of video signals to be encoded but it may not largely vary since coding is achieved within one frame. Therefore, the audio data has no considerable variation in its length. Sometimes an image may contain character data, and sometimes it may contain none. However, the amount of character data per scene is much smaller than that of the video data and, therefore, it is negligible.

The prior art for which the present invention was made is disclosed in the technical report titled "CODEC for video delivery services and video Conference services" of IEIEC (Institute of Electronics, Information and Communication Engineers) No. IE93-41, 1993-07. The prior art dealt with the same contents and the same users system of communication services as the present invention but it proposed that each terminal periodically perform in-frame coding to make the data suitable for storage and reproduction.

On the contrary, the present invention provides that universal visual telephone terminals be used and that the communications center makes the data adaptable for storage and reproduction.

On the other hand, the present invention relates to a data multiplexing system which enables all stored data, including video signals, to be reproduced in conformity with the communications conditions that will assure broad utilization of storage and forward communications services by means of terminals such as universal visual telephone equipment.

As mentioned above, the conventional video delivery services must have center facilities to generate information, change the stored data, convert the media and the stored data by half. On the other hand, the data multiplexing method currently used in video communications, i.e. visual telephone communications, combines the data of each half by a bit. If the multiplexed data is stored as is, the center processor can hardly generate any information or change it.

In the case of realizing video delivery services including dynamic images, the video transmitting format currently applied, for example in visual telephone services, utilizes the interframe prediction technique for compressibly encoding the video data and therefore it may have a certain amount of information per frame which considerably differs from the format utilizing the interframe predictive coding. Consequently, when packets for storing video and audio data according to video signals per frame are formed, the packets may differ from one another in the size and the amount of information to be stored. This may cause the discontinuation of the data's flow when reproducing the stored video data in a certain sequence. Since the conditions of the communications between the terminals may be changed at any time, it is impossible to use a packet of a fixed structure.

The conventional coding method may be applied by increasing the number of frames of still images without using an interframe predictive coding to simulate dynamic images. In this case, the quantity of data encoded without interframe prediction is ten times larger than that of the data encoded by the interframe predictive coding. An attempt to transmit data necessary for regenerating an image to be observed as it moves, leads to an increase in the cost of the transmission. This may also require an increase in the capacity of a transmission line.

SUMMARY OF THE INVENTION

It is an object of the present invention to provide a video communication system which is made to provide a video communication system for use in dynamic video (i.e. moving pictures) store and delivery services and which is capable of easily storing and reproducing conventionally used video signals, i.e. visual telephone signals encoded by interframe predictive coding thereby eliminating the possibility of an interruption in the flow of data during in the process of image reproduction.

It is another object of the present invention to provide a video communication system, when the signals of a frame are separated and stored, separated video data, audio data and character data are assembled into respective packets which correspond to the respective bit rates and are completed each with a header of information identifying the packet's structure and the multiplexing conditions and is then stored. When reproducing the stored packets, the structure of each packet is judged from the header information and the stored data is reassembled from the packets and reproduced. Therefore, the data separating-multiplexing system, according to the present invention can achieve easy storage/reproduction of interframe predictive video signals such as those adopted in visual telephone services. This system can also realize the continuous data reproduction of moving pictures, even at conventional visual telephone terminals.

The object of the present invention is to provide a video communications system wherein video and audio signals multiplexed by a first separating-multiplexing device are assembled into packets proportional to a bit rate of the multiplexed data by a packet separating-multiplexing device appended with information on the packet's structure and then stored in the form of a series of packets. When the stored packets are reproduced, the packet separating-multiplexing device analyzes the structure of each packet according to the information of the multiplexing conditions and disassembles the packets into individual data and decodes the video and audio signals.

The application of the above-mentioned data multiplexing and separating system enables the communications center to prepare and/or change the data and to store data, encoded by the conventional dynamic video coding method and to complete the video-delivery services without an interruption of data in its reproduction at any of the conventional visual telephone terminals.

To realize the above-mentioned objectives, the present invention was made.

To provide a video communications system comprising a first CODEC converter to encode or decode input video data; a second CODEC (converting means) to encode or decode inputted audio data; a first separating-multiplexing device to separate and multiplex signals input from the first converter and the second converter and other data; a first communications device to transmit signals multiplexed by the first separating-multiplexing device; a first controller to control the first converter the second converter and the first communications device; a second communication device to receive the multiplexed signals transmitted from the first communications device; a second separating-multiplexing device to separate a part of the signals received by the second communications device; a packet separating-multiplexing device to assemble data into packets to be stored; a storage device to store the data packets formed by the packet separating-multiplexing device; a second controller to control the second communications device, the second separating-multiplexing device, the packet separating-multiplexing device; characterized in that video and audio signals multiplexed by the first separating-multiplexing device prior to transmisssion are assembled into packets proportional to a bit rate of the multiplexed data by the packet separating-multiplexing device upon reception and are then appended with information on the multiplexing conditions, i.e. the manner in which the packets are formed; and then the packets are stored and when the stored packets are reproduced, the packet separating-multiplexing device identifies the packet's structure according to the information of the multiplexing conditions, disassembles the packets into separate data and further decodes the video and audio signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus, are not limitative of the present invention and wherein.

PREFERRED EMBODIMENT OF THE INVENTION

Figure 1B:
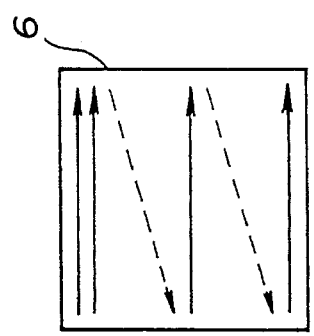
FIGS. 1A and 1B show the conventional format of multiplexed data.
Figure 1A:
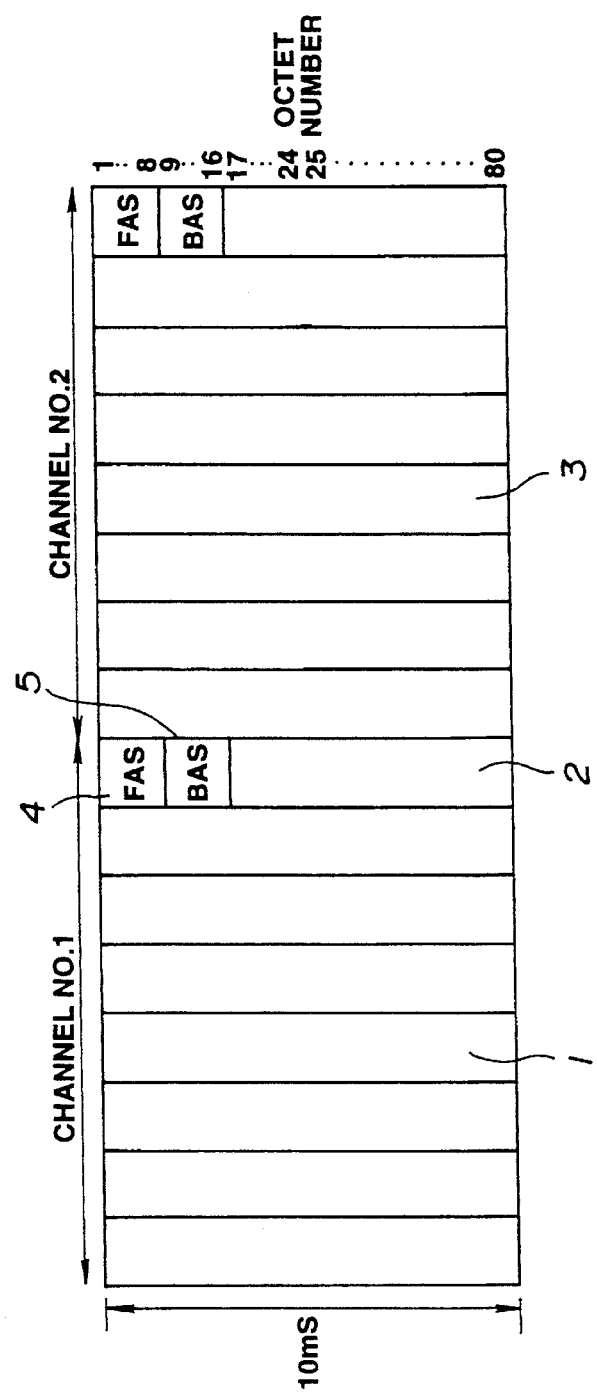

FIGS. 1A and 1B show a conventional data multiplexing format for use in multiplexing data for visual telephone communications and the like. This system is adopted as an international standard for data multiplexing by which the interconnection of visual telephones or the like is assured. In the drawings, numerals 1, 2 and 3 designate areas allocated to audio data, character data and video data, respectively. Numeral 4 denotes bits for frame synchronization, numeral 5 denotes bits for transmitting capacity information and commands between terminals; and numeral 6 denotes a sequence for transmitting data to a communication channel. Data transmission begins with the first bit of the first acted. It is always possible to change the multiplexing condition of the information by using the bits 5 for transmitting the capacity and commands.

Figure 2:
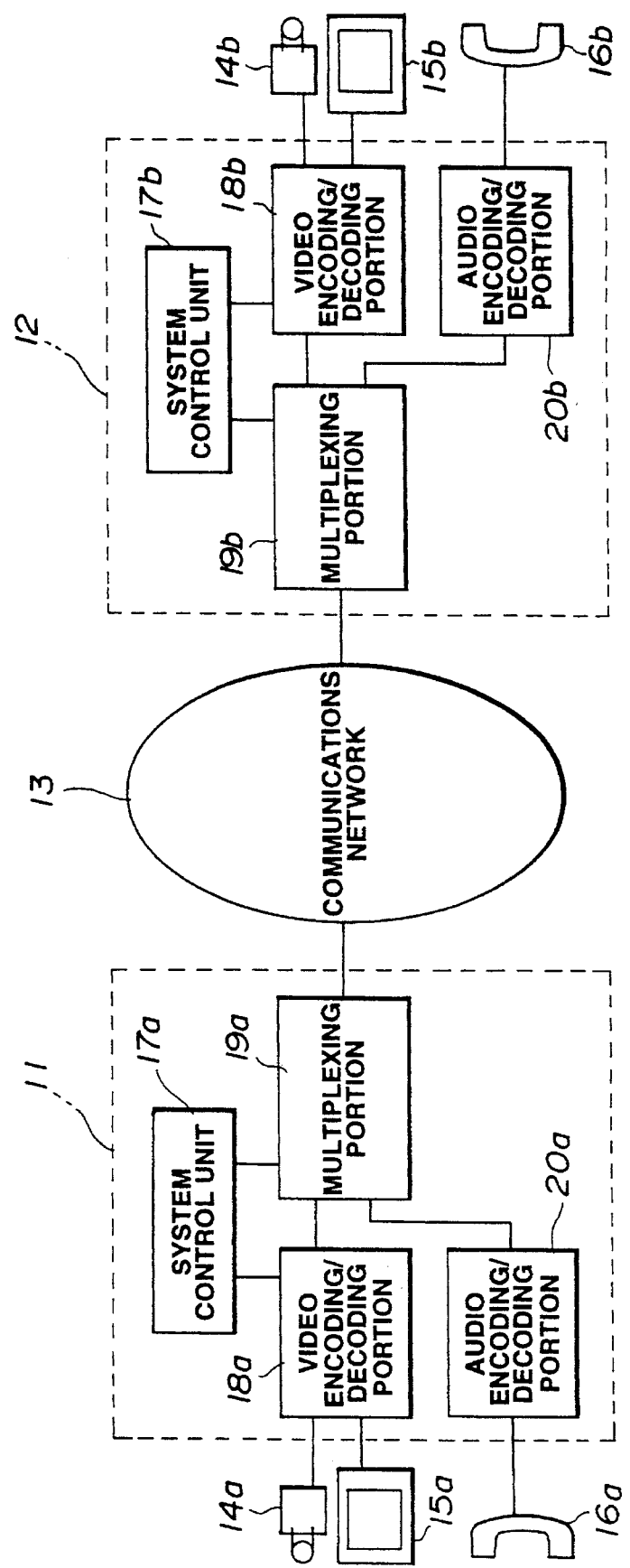
FIG. 2 is a construction view of a conventional video communications system.

FIG. 2 shows a construction view of a conventional video communications system for use with visual telephones which includes a transmitting terminal 11; a remote terminal 12, a communications network 13, such as ISDN, cameras 14a and 14b to input video signals, monitors 15a and 15b to put out video signals, handsets 16a and 16b to input/output audio signals, terminal system control units 17a and 17b, video encoding/decoding portions 18a and 18b, multiplexing portions 19a and 19b for combining (multiplexing) encoded video data, audio data and control information and of transmitting of the combined coded data over the network and audio encoding/decoding portions 20a and 20b.

An input video signal through the camera 14a of the transmitting terminal 11 enters into the encoding portion 18a whereby it is encoded with stored amounts of information by an interframe predictive coding method. On the other hand, an audio signal input through the handset 16a is encoded by the audio encoding portion 20a. Both encoded video and audio signals enter into the multiplexing portion 19a whereby they are combined with each other and completed with a video control signal designated by the terminal system control unit 17a after which they are sent to the communications network 13. The multiplexed data is transmitted over the network to the remote terminal 12 wherein the data is separated into individual signals i.e., a video signal, an audio signal and a video control signal by the action of multiplexing portion 19b. The video control signal, the video coded signal and the audio coded signal are transferred to the system control unit 17b, the video decoding portion 18b and the audio decoding portion 20b, respectively. In the video decoding portion 18b, the video data encoded by the interframe predictive coding method is decoded and then is put out to create an image on the screen of the monitor 15b. In the audio decoding portion 20b, coded audio data is decoded and put out to the handset 16b. The video control signal is treated by the system control unit 17b. The above-mentioned actions are conducted through a two-way transmission line to produce bidirectional visual telephone communications.

Figure 3:
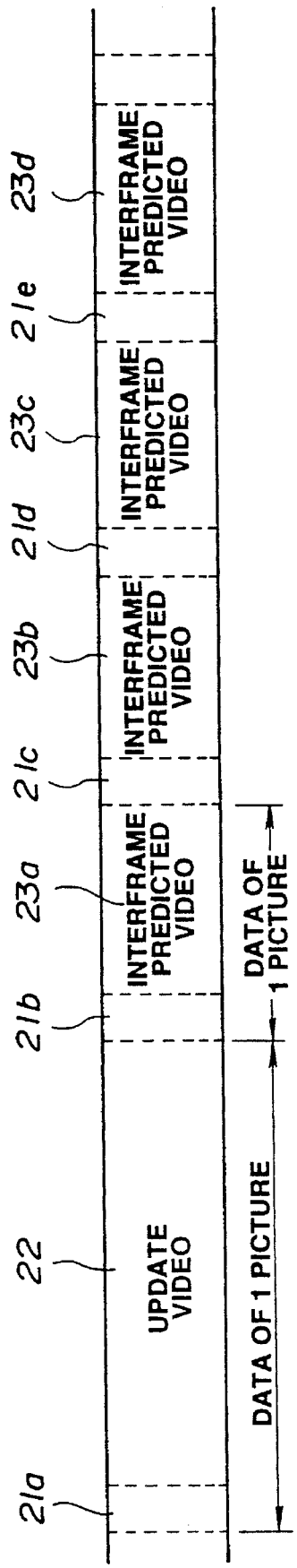
FIG. 3 shows a data format for use in a conventional video communications system.

FIG. 3 shows the data format used in a conventional video communications system, as for example, the data format used in the case when video data is encoded by the interframe predictive coding method. The data format is composed of header information 21a, 21b, 21c, 21d, 21e for identifying the beginning of one frame of video data. The data includes video data 22 that serves as a standard for interframe predictive coding and which is updated and video data 23a, 23b, 23c, 23d encoded by the interframe predictive coding method.

FIG. 3 shows the video data encoded by the video decoding portion 18a or 18b according to-the interframe predictive coding method. The interframe predictive coding method is such that video data of a predicted picture is encoded in a compressed form to include only differential data between a standard updated picture and the succeeding picture, utilizing a very strong correlation between the frames of the moving picture data. This method enables us to considerably reduce the number of video data needed to be transmitted since the predicted picture includes a very small amount of data in comparison with the updated picture. The header information 21a, 21b, 21c, 21d, 21e is attributive information attached, when coding, to the beginning of the corresponding frame of video data. The updated video data 22 is one frame of video data encoded therein in the same way as a still picture, and after coding, it has a number of the coded data equivalent to that of the still picture. The interframe predicted video data 23a, 23b, 23c, 23d are defined by determining the a difference between the updated video data and the video data of a subsequent frame and it is represented as a frame which includes only differential data.

Figure 4:
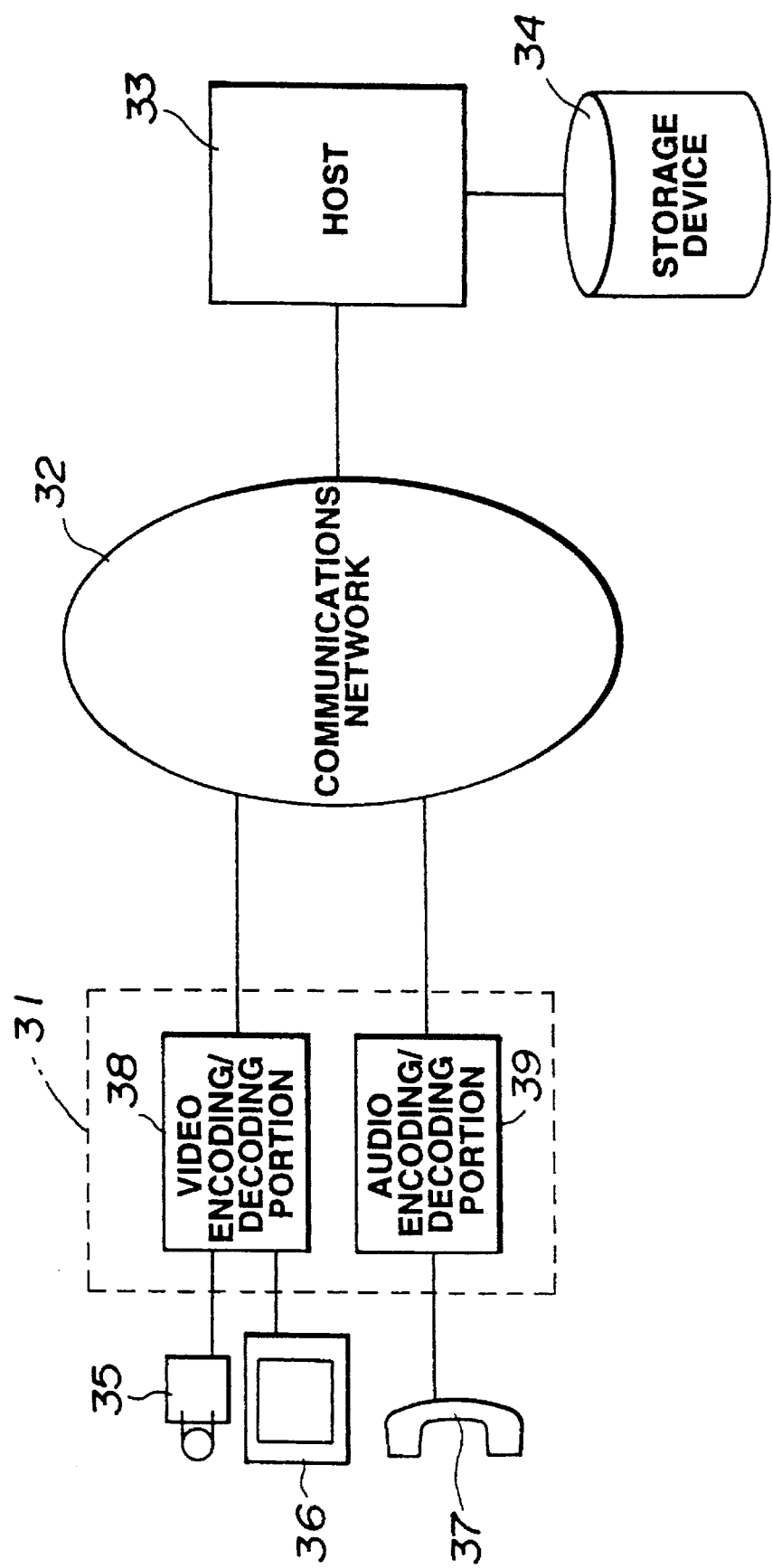
FIG. 4 is a construction view of a conventional video storing and reproducing system utilizing still pictures.

FIG. 4 is a construction view of a conventional video storing and reproducing system utilizing still pictures. This system is adopted in still video storage and delivery services. The system includes a terminal 31, a communications network 32 (such as ISDN), a communications host 33, video storage device 34 for storing pictorial images, a video input camera 35, a video output monitor 36, a handset 37 for inputting/outputting audio signals, a video encoding/decoding portion 38 for encoding/decoding still picture data and an audio encoding/decoding portion 39 for encoding/decoding audio signals.

The host 33 and the terminal 31 are connected to a communications network 32 (such as ISDN) and operate to gain access to each other at the host's or the terminal user's request. When a circuit therebetween is established, a guiding picture from the host is displayed on the screen of the monitor 36. Referring to the guiding display, the terminal user selects a menu for storing or reproducing video signals by one frame representing a still image with an audio signal. The video signal to be stored in the memory is input through the camera 35 and an audio signal to be stored is input through the handset 37. The input video and audio signals are encoded respectively by the video encoding portion 38 and the audio encoding portion 39 and then they are transmitted over the communications network to the host which in turn combines and stores the received encoded video and audio signals in the storage device 34.

Figure 5:
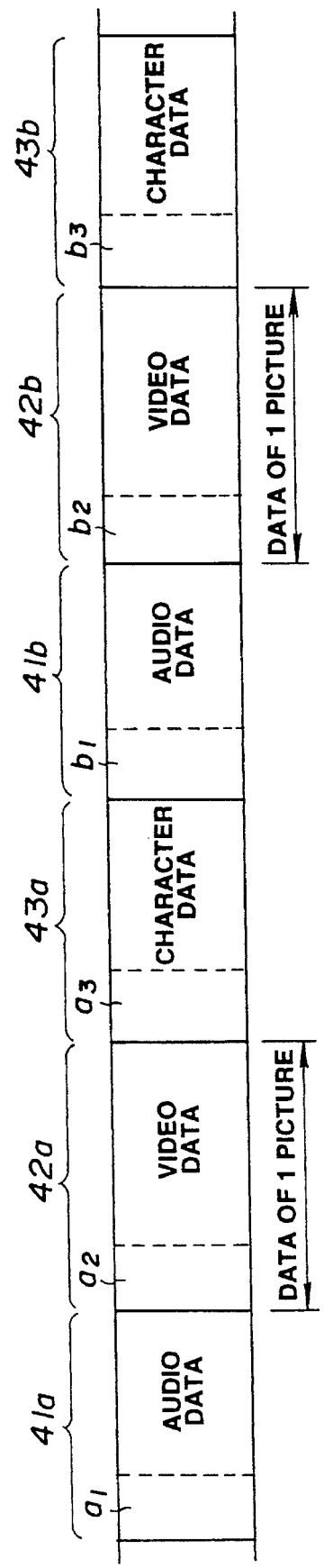
FIG. 5 shows a stored data format for a conventional video storing and reproducing system utilizing still pictures.

FIG. 5 shows the data format for storage in a conventional video storing and reproducing system utilizing still images. The system is adopted in a still-video delivery service. The format includes audio data 41a and 41b each having an identifying flag $a_1$, $b_1$, a one-frame video data 42a and 42b each having an identifying flag $a_2$, $b_2$ and character data 43a and 43b each having an identifying flag $a_3$, $b_3$. The data format shown in FIG. 5 is used in the case when the video and audio data are multiplexed and stored in the storage device 34 in the system shown in FIG. 4. A set of data is described in such a way that a packet of one-frame video data 42a (42b) is combined with the audio data 41a (41b) having an identifying flag and the character data 43a (43b) also having an identifying flag. The number of bits in a packet of video data 42a (42b) depends upon the types of video signals to be encoded but it may not largely vary since coding is achieved within one frame. Therefore, the audio data 41a and 41b has no considerable variation in its length. Sometimes an image may contain character data, and sometimes it may contain none. However, the amount of character data per scene is much smaller than that of the video data and, therefore, it is negligible.

Referring now to the accompanying drawings, preferred embodiments of the present invention will be described in detail as follows.

Figure 6:
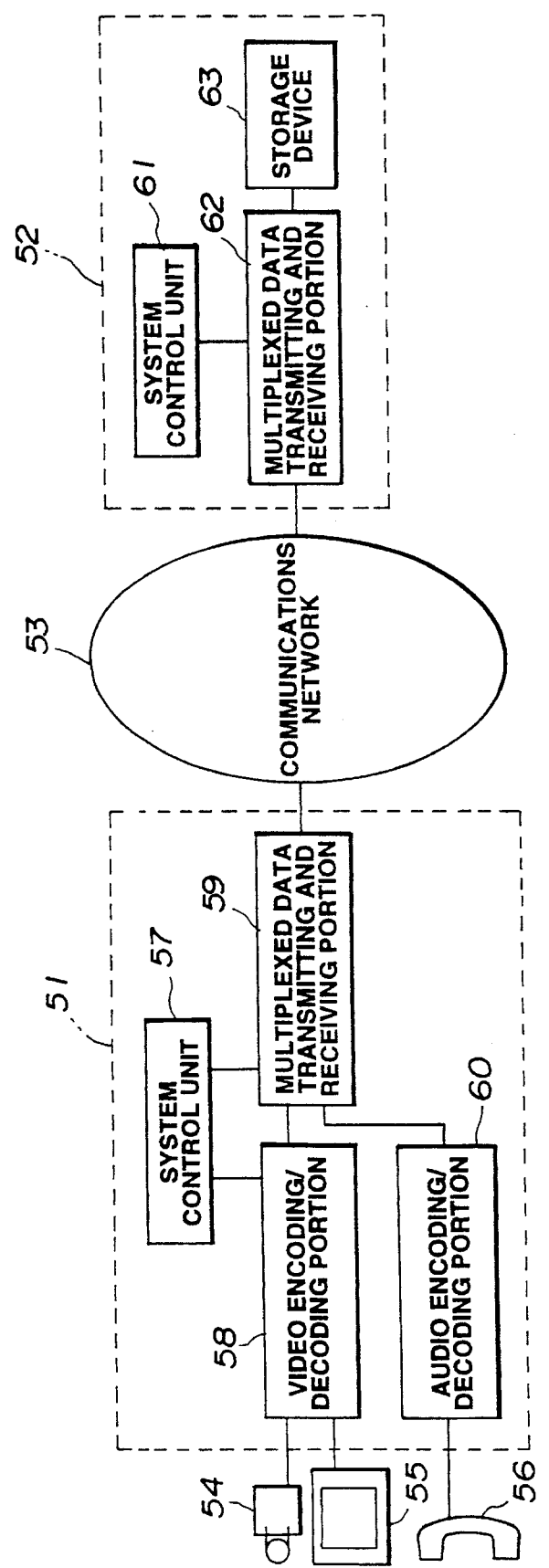
FIG. 6 is a construction view for explaining a video communications system embodied in the present invention.

FIG. 6 is a construction view for explaining a video communications system embodied in the present invention. The shown system includes a terminal 51, a host 52, a communications network 53 (such as ISDN), an image inputting camera 54, an outputting image monitor 55, a sound input/output handset 56, a terminal systems control unit 57, a video encoding/decoding portion 58, a multiplexed data transmitting/receiving portion 59 for combining encoded video data, encoded audio data and to control the information and transmitting the multiplexed data to a line of the communications network, an audio encoding/decoding portion 60, a host system control unit 61, a multiplexed data transmitting/receiving portion 62 for separating the controlled information from multiplexed data and for combining coded data at the host, and a storage device 63 for storing the data.

A dynamic image (moving picture) input through the camera 54 at the terminal 51 is encoded by the video encoding portion 58 according to an interframe predictive coding method. -At this time, coded header information is added to the encoded video data according to instructions from the terminal system control unit 57. Audio data input through the handset 56 are encoded by the audio encoding/decoding portion 60. Both coded video and audio data and a control code are multiplexed by the multiplexed data transmitting portion 59 and then transferred to the host 52 through the communications network 53. The host 52 receives the multiplexed data from the terminal 51 at its multiplexed data receiving portion 62 and stores them in the adequate file form in the storage device 63.

The stored data is read out from the storage at the request of the terminal user, or the host, and transferred to the multiplexed data transmitting portion 62 whereby the control information of the data is renewed according to the instructions given by the system control unit 61 and then transmitted through the network 53 to the terminal 51. The terminal 51 receives the data having the renewed control code from the host by its multiplexed data receiving portion 59 which separates the data into the control code, the video data and the audio data and transfers the control code to the terminal system control unit 57. The encoded video data separated at the multiplexed data receiving portion 59 is transferred to the video decoding portion 58 wherein the separated video data is decoded according to the instructions of the system control unit 57 and the original moving image is reproduced on the monitor screen 55. The separated audio data is decoded and reproduced by the audio decoding portion 60 and the sound is emitted from the handset 56.

During the storing and reproducing of data, communications may be always realized through a bidirectional channel, allowing any controlled information to be transmitted therethrough irrespective of the existence or absence of video data to be transmitted.

Figure 7:
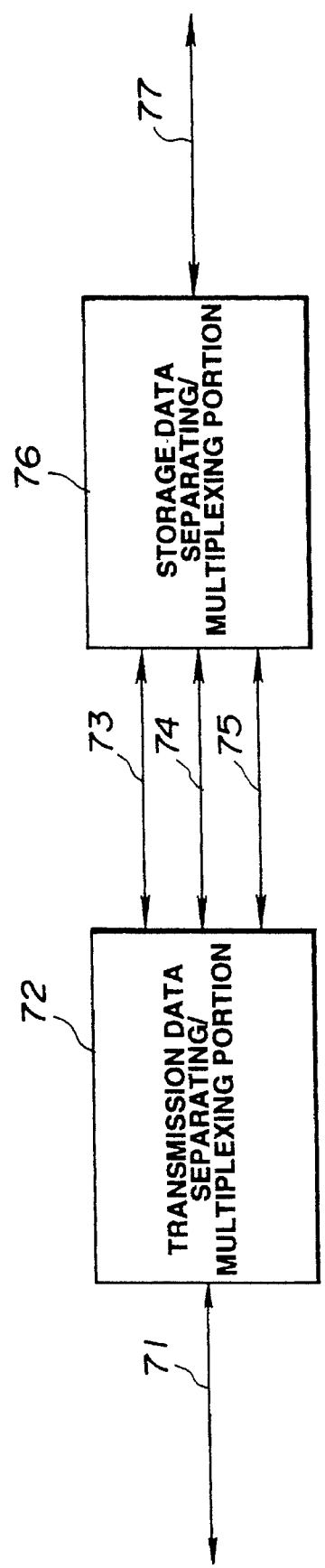
FIG. 7 is a construction view of a separating and multiplexing portion of the multiplexed data transmitting and receiving portion shown in FIG. 6.

FIG. 7 is a construction view of a data separating/multiplexing portion included in the multiplexed data transmitting/receiving portion (see FIG. 6) according to the present invention. In FIG. 7, numeral 71 designates data multiplexed from audio sources, video sources and character sources and being transmitted through a channel. Numeral 72 indicates a transmission data separating-multiplexing portion for separating the multiplexed data into audio data, numerals 73, 74 and 75 denote, respectively, the audio data, the video data and the character data separated from each other from the data previously encoded and multiplexed at a terminal. Numeral 76 designates a stored data separating-multiplexing portion wherein data separation and multiplexing according to the present invention is carried out and numeral 77 indicates stored data multiplexed by the data separating-multiplexing method according to the present invention.

As shown in FIG. 7, the multiplexed data 71 is transmitted through a bidirectional channel from a terminal to a host and vice versa. The multiplexed data of the format shown in FIG. 1 is inputted in turn bit by bit, into the transmission data separating-multiplexing portion 72 wherein they are separated into separate audio 73, video 74 and character 75 data. The separated data is transferred to the storage data separating-multiplexing portion 76, which defines the data multiplexing conditions by using bits 5 for the transmitting of capacity information and which commands in such a way that it may be understood by the data separating-multiplexing portion 72. Then that portion creates multiplexed data 77 and stores it in a storage device 63. The stored data may be transmitted from the host to the terminal in the reverse order of processing.

Figure 8:
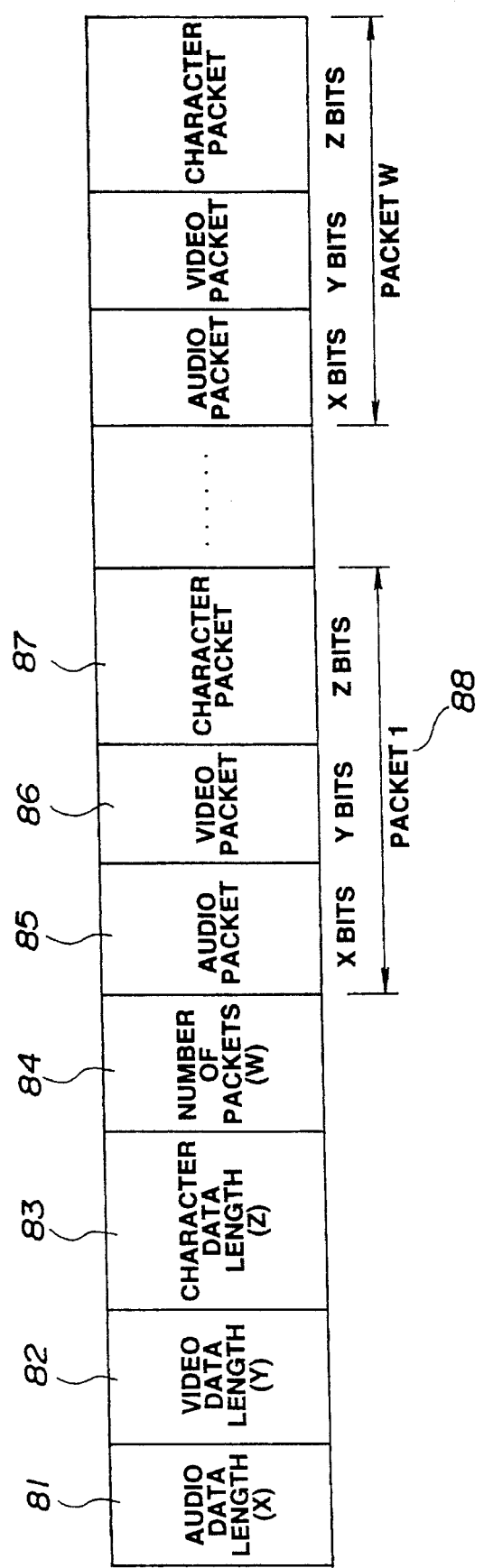
FIG. 8 shows the format of data multiplexed by a data separating and multiplexing system according to the present invention.

FIG. 8 shows a multiplexed data format used in a data separating-multiplexing system according to the present invention. In FIG. 8, numerals 81, 82, 83 designate, respectively, an audio data length per packet, a video data length per packet and a character data length per packet. Numeral 84 designates numbers of packets of audio, video and character data and numerals 85, 86 and 87 indicate respectively, an audio data packet, a video data packet and a character data packet.

The data's length 81, 82, 83 for each packet is determined by the calculation from a bit rate of the capacity and command transmission bits 5 and the time of one packet to be formed. The number of packets 84 is equal to the total of the audio, video and character packets to be stored by one storage process. Each kind of data is described in terms of the number of bits designated by the respective data's length 81, 82, 83 and is arranged in a packet 85, 86, 87. Thus a designed packet may have a constant size adapted to the reproducing sequence irrespective of the amount of video data.

When reproducing the stored data, it is possible to judge the bit rate of each kind of stored data from the data's length 81, 82, 83. Consequently, it becomes possible to set the communications' conditions according to the data bit rate by using the capacity and command bits 5. Thereby, the data stored under different communication conditions can be easily reproduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A multiplex communication system using separated and multiplexed data for compressing information of a dynamic image, multiplexing and storing the compressed information together with audio data and character data, and reproducing and decoding the stored information, the multiplex communication system comprising:

storage means for assembling video, audio and character data of the multiplexed information into packets of length which depends upon a bit rate of the multiplexed information, appending condition information to the packets indicative of multiplexing conditions of the packets, and storing the appended packets therein; and judging means for identifying packet structure in accordance with the condition information during reproduction of the packets stored in said storage means and disassembling the packets into separate data based on the identified packet structure to decode the video, audio and character data.

2. A multiplex communication system using separated and multiplexed data comprising:

first converting means for encoding input video data;

second converting means for encoding input audio data;

first separating-multiplexing means for multiplexing output signals from said first converting means and said second converting means with video and audio data;

first communication means for transmitting multiplexed signals output by said first separating-multiplexing means;

first control means for controlling said first converting means, said second converting means, said first separating-multiplexing means, and said first communication means;

second communication means for receiving the multiplexed signals transmitted from said first communication means;

second separating-multiplexing means for separating a part of the multiplexed signals received by said second communication means;

packet separating-multiplexing means for assembling the separated data into data packets for storage;

storage means for storing the data packets formed by said packet separating-multiplexing means; and second control means for controlling said second communication means, said second separating-multiplexing means, and said packet separating-multiplexing means, said packet separating-multiplexing means assembling, from the separated data, the video and audio data multiplexed by said first separating-multiplexing means into data packets of length which depends on a bit rate of the multiplexed data and appending condition information to the data packets information indicative of the multiplexing conditions of the data packets, the appended data packets subsequently being stored in said storage means.

3. The multiplex communication system of claim 2, wherein upon reproduction of the data packets stored in said storage means, said packet separating-multiplexing means identifies packet structure of the data packets in accordance with the condition information indicative of the multiplexing conditions, disassembles the data packets into separate data based upon the identified packet structure and further decodes the video and audio data from disassembled separate data.

4. The multiplex communication system of claim 1, wherein the condition information appended to the packets comprises information indicative of audio data length, video data length and a number of packets for a corresponding storage operation.

5. The multiplex communication system of claim 4, wherein the condition information further comprises information indicative of character data length.

6. The multiplex communication system of claim 2, wherein the condition information appended to the data packets comprises audio data length, video data length and a number of data packets for a corresponding storage operation.

7. The multiplex communication system of claim 6, wherein said first separating-multiplexing means also multiplexes encoded character data into the multiplexed signals, the condition information appended to the data packets further comprising character data length.

8. The multiplex communication system of claim 2, wherein the data packets stored in said storage means are retrieved by said packet separating-multiplexing means, which identifies packet structure of the data packets and separates the data packets in accordance with the condition information, the retrieved separated data being multiplexed by said second separating-multiplexing means and subsequently being transmitted by said second communication means to said first communications means to be separated by said first separating-multiplexing means and thereafter decoded respectively into retrieved video data and retrieved audio data by said first and second converting means.

9. The multiplex communication system of claim 2, wherein said first and second converting means respectively compress the encoded video data and the encoded audio data.

10. A multiplex communication system using separated and multiplexed data for dynamic image information storage and retrieval, the dynamic image information including audio data, video data and character data, the multiplex communication system comprising:

terminal means, through which the dynamic image information is input and retrieved, for (a) converting input audio data into encoded audio data, (b) converting input video data into encoded video data, (c) multiplexing the encoded audio data, the encoded video data and character data into multiplexed data, and (d) transmitting the multiplexed data from said terminal means along a communication network; and host means, operatively coupled to said terminal means through the communication network, for (a) receiving the transmitted multiplexed data, (b) separating the multiplexed data into separated data comprising the audio data, the video data and the character data, (c) assembling the separated data into data packets of length which depends upon a bit rate of the multiplexed data transmitted from said terminal means, (d) appending to the data packets condition information indicative of the multiplexing conditions of the data packets, (e) storing the appended data packets in a storage memory, and (f) retrieving the stored data packets from said storage memory, said host means identifying packet structure of the stored data packets and disassembling the data packets into the separated data in accordance with the retrieved condition information.

11. The multiplex communication system of claim 10, wherein said condition information comprises information indicative of audio data length, video data length and a number of data packets stored for a corresponding storage operation.

12. The multiplex communication system of claim 11, wherein the condition information further includes information indicative of character data length.

13. The multiplex communication system of claim 10, wherein said host means multiplexes the retrieved separated data into retrieved multiplexed data and transmits the retrieved multiplexed data to said terminal means via the communication network, said terminal means demultiplexing and decoding the retrieved multiplexed data transmitted from said host means into audio data and video data.

14. The multiplex communication system of claim 10, wherein said terminal means compresses the encoded audio data and the encoded video data prior to multiplexing.

* * * * *